United States Patent [19]

Choi

[11] Patent Number: 5,745,510

[45] Date of Patent: Apr. 28, 1998

[54] SYSTEM FOR DETECTING FRAME/BURST SYNCHRONIZATION AND CHANNEL ERROR USING CYCLIC CODE

[75] Inventor: Yang Ho Choi, Seoul, Rep. of Korea

[73] Assignee: Korea Telecommunications Authority, Seoul, Rep. of Korea

[21] Appl. No.: 496,683

[22] Filed: Jun. 29, 1995

[30] Foreign Application Priority Data

Jun. 29, 1994 [KR] Rep. of Korea ............... 94-15086

[51] Int. Cl.$^6$ ........................................ H04L 7/00
[52] U.S. Cl. ........................................ 371/47.1
[58] Field of Search ........................ 371/42, 47.1

[56] References Cited

U.S. PATENT DOCUMENTS

| | | | |
|---|---|---|---|
| 3,336,467 | 8/1967 | Frey, Jr. | 371/42 |
| 3,466,601 | 9/1969 | Tong | 371/42 |
| 3,550,082 | 12/1970 | Tong | 371/42 |
| 3,571,794 | 3/1971 | Tong | 371/42 |
| 3,938,086 | 2/1976 | Valbonesi | 371/42 |
| 3,961,311 | 6/1976 | Pavoni et al. | 371/42 |
| 4,468,770 | 8/1984 | Metcalf et al. | 371/42 |
| 4,821,270 | 4/1989 | Mauge | 371/47.1 |
| 5,084,891 | 1/1992 | Ariyavisitakul et al. | 371/42 |
| 5,280,484 | 1/1994 | Weis | 370/102 |
| 5,282,215 | 1/1994 | Hyodo | 371/42 |
| 5,345,451 | 9/1994 | Uriu et al. | 371/42 |
| 5,367,544 | 11/1994 | Bruekheimer | 375/116 |

OTHER PUBLICATIONS

Tong, "Synchronization Recovery Techniques for Binary Cyclic Codes", The Bell System Technical Journal, Apr. 1966, pp. 561–597.

Peterson et al., "Error–Correcting Codes", 2nd ed., The MIT Press, copyright 1972, pp. 376–381, Dec. 1972.

Bahl et al., "Shortened Cyclic Code with Burst Error Detection and Synchronization Recovery Capability", IBM Technical Disclosure Bulletin, vol. 16, No. 6, Nov. 1973, pp. 2028–2030.

*Primary Examiner*—Stephen M. Baker
*Attorney, Agent, or Firm*—Merchant Gould Smith Edell Welter & Schmidt

[57] ABSTRACT

A system for detecting a frame/burst synchronization and a channel error using a cyclic code (n,k). A received block of 2n–k bits is divided into a head block including first n–k bits of the received block, a middle block including the subsequent k bits of the received block and a tail block including last n–k bits of the received block. Head and tail syndromes are obtained on the basis of the divided head, middle and tail blocks. The frame/burst synchronization and the presence of the channel error are detected on the basis of the obtained head and tail syndromes.

5 Claims, 2 Drawing Sheets

SYSTEM FOR DETECTING FRAME/BURST SYNCHRONIZATION AND CHANNEL ERROR USING CYCLIC CODE

BACKGROUND OF THE INVENTION

1. Field of the Invention

The present invention relates to a system for efficiently detecting a frame/burst synchronization and a channel error using a cyclic code.

2. Description of the Prior Art

As a cyclic code, there is usually used a systematic code which has a code word including a message block at its head portion and cyclic redundancy check (referred to hereinafter as CRC) bits at the subsequent portion. The CRC bits allow a syndrome of the code word to become "0". The presence of a channel error in the cyclic code can be recognized by calculating the syndrome of the code word. A COSET code is produced by inverting a part of the bits of the code word. The use of the COSET code makes it possible to detect a frame/burst synchronization as well as a channel error. The frame/burst synchronization detection using the cyclic code is made possible only when a burst misalignment is within a given detection range. If the alignment of the transmitted cyclic code is beyond the detection range, the frame/burst synchronization cannot be accurately detected although the transmitted cyclic code has no channel error.

In the above-mentioned cyclic code, assuming that the length of the code word is n and the message length is k, the detection range is theoretically n–k bits at the maximum. For the convenience of the description, it is hereinafter assumed that n–k is an even number.

In a conventional method, the code word is transmitted with its first and last bits marked. A bit slip of ±d, where d=[n–k–2)/2] is detected on the basis of a reference time point which is the center of the detection range. For this reason, the entire synchronization detection range is n–k–1 bits, which is smaller by one bit than the above theoretical maximum value. Here, the signs (+) and (–) indicate bit slip directions. The sign (+) signifies that an arrival time point of the burst is earlier than the reference time point, namely, the bit slip is present in the right direction. The sign (–) signifies that the arrival time point of the burst is later than the reference time point, namely, the bit slip is present in the left direction.

The conventional method requires a CRC decoding operation twice in all. Namely, the bit slip is detected and the burst is rearranged for the error check on the basis of the detected bit slip. The CRC decoding operation is performed at the respective steps.

The bit slip is detected by processing a block including n bits. In detail, the first bit (positioned at the reference time point) and the nth bit of the block to be processed are unmarked. Under this condition, a syndrome of the n-bit block is obtained through the CRC decoding operation. In the case where a pattern of the obtained syndrome is in accord with one of synchronization syndrome patterns shown in the following table I, the bit slip can be recognized. If the pattern of the obtained syndrome is not in accord with any one of the shown synchronization syndrome patterns, the synchronization detection is processed as failing.

TABLE I

| BIT SLIP (Sr) | SYNCHRONIZATION SYNDROME PATTERNS | |
|---|---|---|
| | HIGHER-ORDER d+1 BITS | LOWER-ORDER d+1 BITS |
| –d | 000 ... 0001 | XXXX ... XX1 |
| –(d · 1) | 000 ... 0001 | XXXX ... X10 |
| . | . | . |
| . | . | . |
| . | . | . |
| –1 | 000 ... 0001 | X100 ... 000 |
| 0 | 000 ... 0000 | 0000 ... 000 |
| 1 | 000 ... 001X | 1000 ... 000 |
| . | . | . |
| . | . | . |
| d – 1 | 01X ... XXXX | 1000 ... 000 |
| d | 1XX ... XXXX | 1000 ... 000 |

In the above table I, "X" signifies a don't care condition. The synchronization syndrome patterns of the lower-order d+1 bits are formed according to the d+1 bits cyclically shifted as mentioned above. The slip direction can be recognized from the higher-order or lower-order bit patterns. Namely, if the higher-order d+1 bits have a pattern of 00 . . . 01, it can be recognized that the bit slip is present in the left direction. If the lower-order d+1 bits have a pattern of 10 . . . 00, it can be recognized that the bit slip is present in the right direction. A size of the bit slip is obtained from a position of the first or last "1" bit in the remaining d+1 bit patterns.

However, the above-mentioned conventional method has a disadvantage in that it requires the marking and CRC decoding operations twice in all, resulting in a complexity in system construction and an increase in processing time.

SUMMARY OF THE INVENTION

Therefore, the present invention has been made in view of the above problem, and it is an object of the present invention to provide a system which is capable of detecting a frame/burst synchronization and a channel error by performing a CRC decoding operation once.

In accordance with the present invention, the above and other objects can be accomplished by a providing a system for detecting a frame/burst synchronization and a channel error using a cyclic code (n,k), comprising means for receiving a block of 2n–k bits, dividing the received block into a head block including first n–k bits of the received block, a middle block including the subsequent k bits of the received block and a tail block including last n–k bits of the received block, obtaining head and tail syndromes on the basis of the divided head, middle and tail blocks and discriminating the frame/burst synchronization and the presence of the channel error on the basis of the obtained head and tail syndromes.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

First, the synchionization/error detection principle of the present invention will hereinafter be described.

It is first assumed that a block R including 2n–k bits is received. In the case where the received block R includes a sequence of bits $\ldots r_{-1}, r_0, r_1, \ldots$, it can be classified into three blocks as follows:

$$R = (r_{-(n-k)}, r_{-(n-k-1)}, \ldots, r_{-1}, r_0, \ldots, r_{k-1}, r_k, \ldots, r_{n-2}, r_{n-1}) = (\gamma_h, \gamma_m, \gamma_t) \quad (1)$$

In the above equation 1, "$\gamma_h$" designates a block including first n–k bits of the received block R, "$\gamma_m$" designates a block including the subsequent k bits of the received block R and "$\gamma_t$" designates a block including last n–k bits of the received block R. The blocks $\gamma_h$, $\gamma_m$ and $\gamma_t$ can be expressed as follows:

$$\gamma_h = (r_{-(n-k)}, r_{-(n-k-1)}, \ldots, r_{-1})$$

$$\gamma_m = (r_0, r_1, \ldots, r_{k-1})$$

$$\gamma_t = (r_k, r_{k+1}, \ldots, r_{n-2}, r_{n-1}) \quad (2)$$

For the convenience of the description, the blocks $\gamma_h$, $\gamma_m$ and $\gamma_t$ will hereinafter be defined as head, middle and tail blocks, respectively.

Figure 1:
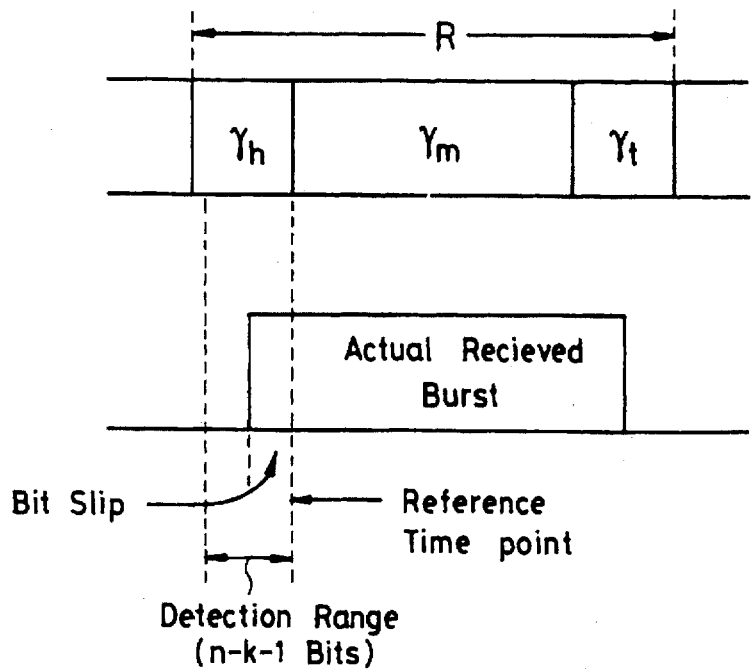
FIG. 1 is a view illustrating head, middle and tail blocks of a received block.

FIG. 1 shows the head, middle and tail blocks $\gamma_h$, $\gamma_m$ and $\gamma_t$ of the received block R. FIG. 1 also shows a reference time point which is defined as a position of the first bit of the middle block $\gamma_m$.

Provided that an arrival time point of a transmitted burst has ambiguousness smaller than (n–k–1)-bit time, the transmitted burst can always be present in the received block R. Therefore, in the case of arriving earliest, the first and last bits of the transmitted burst are positioned at $r_{-(n-k-1)}$ and $r_k$, respectively. On the other hand, in the case of arriving latest, the first and last bits of the transmitted burst are positioned at $r_{-1}$ and $r_{n-2}$, respectively. In other words, in the case where the received block R is partitioned as in the above equation 2, the first and last bits of the transmitted burst are positioned in the head and tail blocks $\gamma_h$ and $\gamma_t$, respectively.

Assuming that any transmission error is not present and the first bit of the transmitted burst corresponds to the (n–k+1–j)th bit of the head block $\gamma_h$, the result is:

$$\gamma_h = (r_{-(n-k)}, r_{-(j+1)}, /c_0, c_1, \ldots, c_{j-1})$$

$$\gamma_m = (c_j, \ldots, c_{k-1+j})$$

$$\gamma_t = (c_{k+j}, \ldots, c_{n-2}, /c_{n-1}, r_{n-j}, \ldots, r_{n-1}) \quad (3)$$

where "/$c_0, c_1, \ldots, /c_{n-1}$" are a transmitted COSET code.

The following table II shows syndromes given to an n-bit block ($\gamma_m, \gamma_t$) obtained by adding the tail block $\gamma_t$ to the middle block $\gamma_m$ and to an n-bit block ($\gamma_m, \gamma_h$) obtained by adding the head block $\gamma_h$ to the middle block $\gamma_m$.

TABLE II

| BIT SLIP (S) | SYNCHRONIZATION SYNDROME PATTERNS | |
|---|---|---|
| | TAIL SYNDROME | HEAD SYNDROME |
| 0 | 0000 ... 00001 | XXXXX ... XXXX |
| 1 | 000 ... 0001X | XXXXX ... XXX1 |
| 2 | 0000 ... 001XX | XXXXX ... XX10 |
| 3 | 0000 ... 01XXX | XXXXX ... X100 |
| . | . | . |
| . | . | . |
| . | . | . |
| n – k –3 | 001X ... XXXXX | XXX10 ... 0000 |
| n – k –2 | 01XX ... XXXXX | XX100 ... 0000 |
| n – k –1 | 1XXX ... XXXXX | X1000 ... 0000 |

In the above table II, a bit slip always has a positive value because the first bit of the middle block $\gamma_m$ is the reference time point as previously defined. The first bit of the transmitted burst is always present in the head block $\gamma_h$, so that it is positioned in the left direction by at least one bit from the first bit of the middle block $\gamma_m$.

In the case where the received block R is given as in the equation 3, the tail and head syndromes thereof have patterns when S≡j in the table II. In this case, the first "1" bit of the tail syndrome appears at the (n–k–j)th position from a most significant bit (MSB). The first "1" bit of the head syndrome appears at the jth position from a least significant bit (LSB). The bit slip can be recognized by finding the first "1" bit of the head or tail syndrome, which results from a code word being marked.

If head and tail syndromes of a certain received block have the patterns when S≡j in the table II, it can be seen that an n-bit block arranged at a position shifted to the left by j bits from a middle block of the received block is always the COSET code.

In result, the presence of a channel error as well as the bit slip can be recognized on the basis of the obtained head and tail syndromes of the received block.

The frame/burst synchronization and the channel error can be detected through the following steps on the basis of the above-mentioned principle.

At the first step, an n-bit block $\gamma_S$ is obtained by adding n–k "0" bits to the middle block $\gamma_m$. Namely, the n-bit block $\gamma_a$ is obtained as follows:

$$\gamma_S = (\gamma_m, 0, 0, \ldots, 0) \quad (4)$$

Then, the (n–k) -bit remainder $\gamma_R$ is obtained by CRC-decoding the n-bit block $\gamma_S$.

At the second step, a head syndrome pattern $S_h$ is obtained by adding the head block $\gamma_h$ to the (n–k) -bit remainder $\gamma_R$. Also, a tail syndrome pattern $S_t$ is obtained by adding the tail block $\gamma_t$ to the (n–k) -bit remainder $\gamma_R$. Namely, the head and tail syndrome patterns $S_h$ and $S_t$ are obtained as follows:

$$S_h = \gamma_h + \gamma_R$$

$$S_t = \gamma_t + \gamma_R \quad (5)$$

where "+" signifies an exclusive-OR calculation.

At the third step, the frame/burst synchronization and the channel error are detected by checking whether the obtained head and tail syndrome patterns $S_h$ and $S_t$ are in accord with the synchronization syndrome patterns.

In accordance with the preferred embodiment of the present invention, the bit slip and the code word error can be detected by obtaining the tail and head syndromes through one CRC decoding operation. In other words, the bit slip can be recognized on the basis of one of the tail and head syndromes and the presence of the code word error can be recognized on the basis of the other syndrome.

In the table II, the bits of the head syndrome corresponding to the bits X of the tail syndrome under a don't care condition are set to "0" or "1". Similarly, the bits of the tail syndrome corresponding to the bits X of the head syndrome under the don't care condition are set to "0" or "1". Therefore, a single syndrome can be produced by removing the bits X from the head and tail syndromes and combining the remaining bits. For example, if S=2, the combined syndrome has a pattern of 0000 ... 00110. In the case of S=j, the combined syndrome pattern has "1" bits at the jth and (j+1)th positions from the last. In this case, the combined syndrome pattern is in accord with a block syndrome pattern obtained by cyclically shifting first j bits of the transmitted burst.

Figure 2:
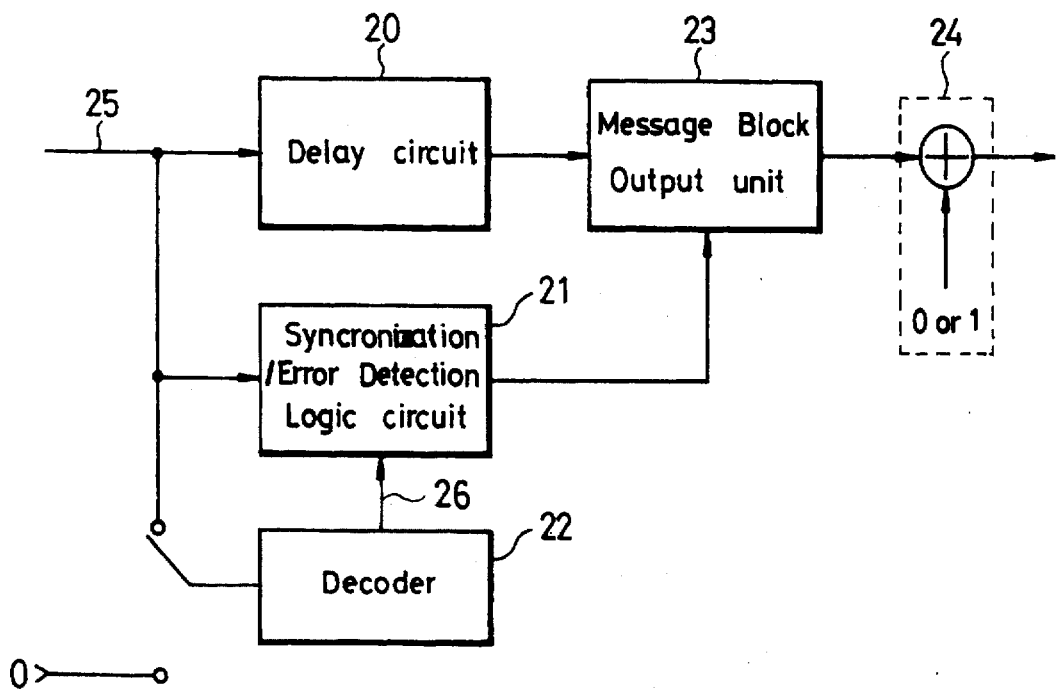
FIG. 2 is a block diagram of a system for detecting a frame/burst synchronization and a channel error in accordance with an embodiment of the present invention.

Referring to FIG. 2, there is shown a block diagram of a system for detecting the frame/burst synchronization and the channel error in accordance with the embodiment of the present invention. As shown in this drawing, the frame/burst synchronization/channel error detection system comprises a delay circuit 20 for delaying a received block 25 for a predetermined time period, a synchronization/error detection logic circuit 21 for detecting the bit slip and the presence of the channel error from the received block 25, a decoder 22 for decoding the received block 25, a message block output unit 23 for outputting a message block of the received block 25 in response to the bit slip detected by the synchronization/error detection logic circuit 21, and a marker 24 for inverting a marked message bit of the message block from the message block output unit 23.

Figure 3:
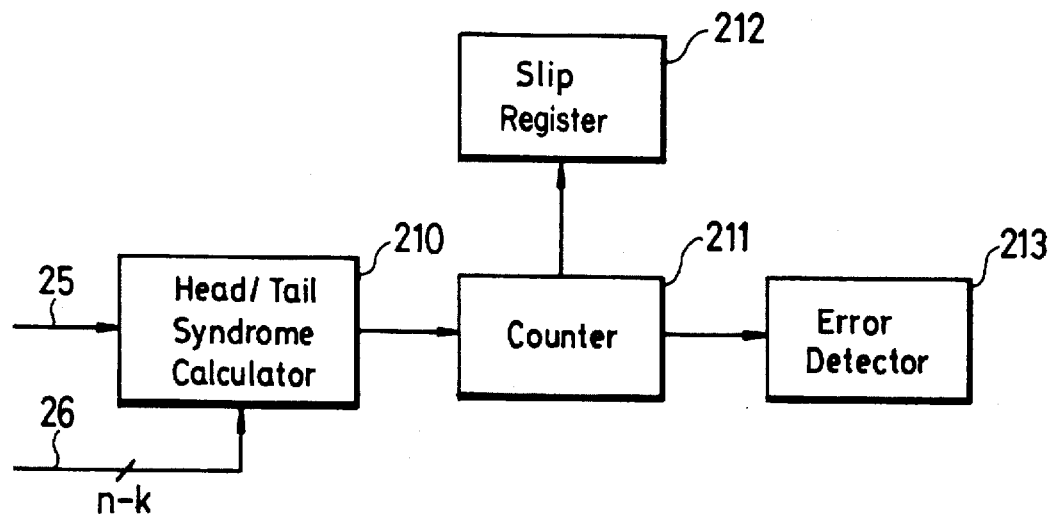
FIG. 3 is a detailed block diagram of a synchionization/error detection logic circuit in FIG. 2.

Referring to FIG. 3, there is shown a detailed block diagram of the synchronization/error detection logic circuit 21 in FIG. 2. As shown in this drawing, the synchronization/error detection logic circuit 21 includes a head/tail syndrome calculator 210, a counter 211, a slip register 212 and an error detector 213.

Figure 4:
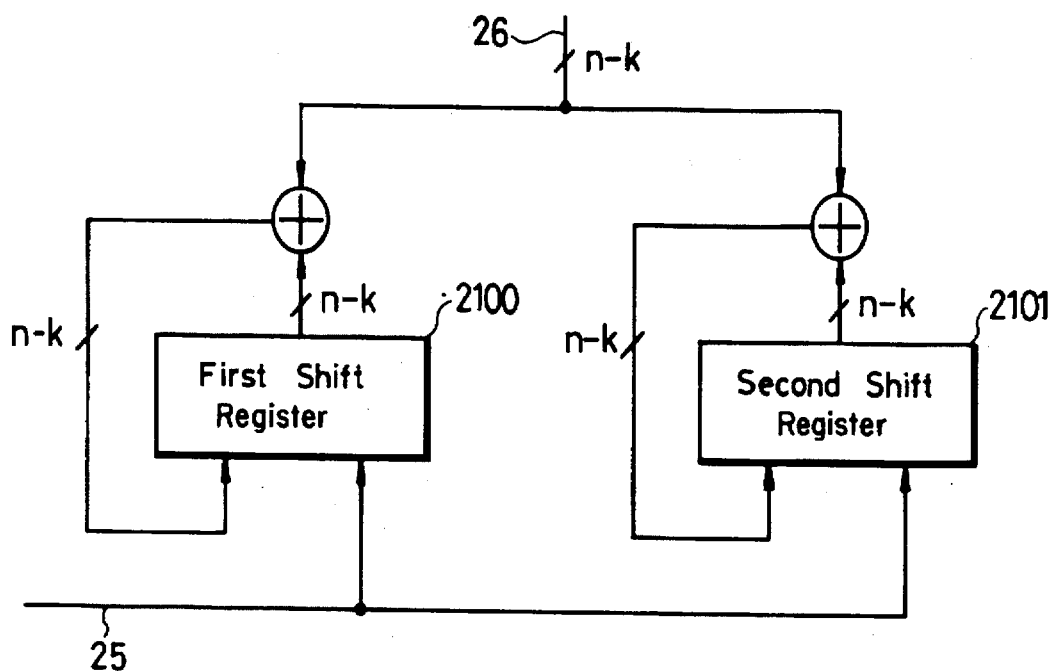
FIG. 4 is a detailed block diagram of a head/tail syndrome calculator in FIG. 3.

Referring to FIG. 4, there is shown a detailed block diagram of the head/tail syndrome calculator 210 in FIG. 3. As shown in this drawing, the head/tail syndrome calculator 210 includes a first shift register 2100 and a second shift register 2101.

The operation of the frame/burst synchronization/channel error detection system with the above-mentioned construction in accordance with the embodiment of the present invention will hereinafter be described in detail with reference to FIGS. 2 to 4.

It is first assumed that a most significant bit of n-k bits is stored at the left in the shift register and a least significant bit thereof is stored at the right in the shift register.

The delay circuit 20 delays the received block 25 for a sufficient time period until the synchronization/error detection logic circuit 21 detects the frame/burst synchronization from the received block 25. Tail and head blocks of the received block 25 are stored into the first and second shift registers 2100 and 2101 of the head/tail syndrome calculator 210 in the synchronization/error detection logic circuit 21, respectively. Upon inputting a middle block of the received block 25, the decoder 22 performs the CRC decoding operation.

After inputting all k bits of the middle block, the decoder 22 inputs n-k "0" bits. As a result, the decoder 22 obtains a syndrome 26 of an n-bit block by performing the decoding operation continuously. The obtained syndrome 26 from the decoder 22 is applied to the head/tail syndrome calculator 210 in the synchronization/error detection logic circuit 21. Then in the head/tail syndrome calculator 210, the obtained syndrome 26 from the decoder 22 is exclusive-ORed with the tail and head blocks stored in the first and second shift registers 2100 and 2101, respectively. In accordance with the exclusive-ORed results, head and tail syndromes are obtained and then stored into the first and second shift registers 2100 and 2101, respectively.

For the detection of the bit slip, the counter 211 counts successive "0" bits beginning with a least significant bit of the head syndrome stored in the second shift register 2101 while bits of the head syndrome are shifted to the right. At the moment that "1" is generated for the first time at the least significant bit of the head syndrome stored in the second shift register 2101, the counter 211 stops its counting operation and stores its count into the slip register 212. At this time, the value stored in the slip register 212 is smaller by one than the bit slip value shown in the table II. The value stored in the slip register 212 indicates a position of the message block in the received block 25 which is delayed by the delay circuit 20 and then transferred to the message block output unit 23. As a result, the message block output unit 23 outputs the message block of the received block 25 in response to the value stored in the slip register 212. Then, the first message bit of the message block from the message block output unit 23 is inverted by the marker 24.

On the other hand, if the output of the counter 211 is stored into the slip register 212, the counter 211 continues to perform its counting operation until "1" is generated at a most significant bit of the tail syndrome stored in the first shift register 2100 while bits of the tail syndrome are shifted to the left. Then, the number of successive "0" bits beginning with the most significant bit of the tail syndrome is added to the obtained number of the successive "0" bits beginning with the least significant bit of the head syndrome. To determine the presence of the channel error, the error detector 213 checks whether the added result is equal to n-k-2.

In accordance with an alternative embodiment of the present invention, only one of the first and last bits of the code word instead of both the bits may be marked in transmitting the burst. This makes it possible to extend a bit slip detection range by one bit as compared with a conventional manner (in the conventional manner the frame/burst synchronization cannot be detected if only one bit is marked in transmitting the burst). In this case, the bit slip detection range corresponds to a theoretical maximum value. The synchronization/error detection operations in the one bit marking case are performed in the same manner as those in the 2-bit marking case as mentioned above. The following table III shows synchronization syndrome patterns in the one bit marking case.

TABLE III

| | SYNCHRONIZATION SYNDROME PATTERNS | |
|---|---|---|
| BIT SLIP (S) | TAIL SYNDROME | HEAD SYNDROME |
| n − k − 1 | 1XXX ... XXXXX | X0000 ... 0000 |
| n − k − 2 | 01XX ... XXXXX | XX000 ... 0000 |
| n − k − 3 | 001X ... XXXXX | XXX00 ... 0000 |
| . | . | . |
| . | . | . |
| . | . | . |
| 2 | 0000 ... 001XX | XXXXX ... XX00 |
| 1 | 0000 ... 0001X | XXXXX ... XXX0 |
| 0 | 0000 ... 00001 | XXXXX ... XXXX |

The above table III shows the syndrome patterns in the case where the last (nth) bit of the code word is marked. From this table III, it can be seen that the frame/burst synchronization can be detected even in the case of S=0.

The frame/burst synchronization/channel error detection system in the one bit marking case is the same in construction as that in the 2-bit marking case, with the exception that the marker 24 is omitted in FIG. 2. The synchronization/error detection logic circuit 21 has the same construction as that in FIG. 3, but a little difference in operation. Namely, the head and tail syndromes are calculated in the same manner as mentioned above. When the calculation of the head and tail syndromes is completed, the counter 211 counts the successive "0" bits beginning with the most significant bit of the tail syndrome stored in the first shift register 2100. The counter 211 then stores the counted result into the slip register 212. At this time, the result obtained by subtracting the value stored in the slip register 212 from n−k−1 is equal to a bit slip value shown in the table III. When the output of the counter 211 has been stored into the slip register 212, the counter 211 counts the successive "0" bits beginning with the least significant bit of the head syndrome stored in the second shift register 2101 while the bits of the head syndrome are shifted to the right. The counter 211 stops its counting operation when its count arrives at n−k−1 or the least significant bit of the head syndrome becomes "1" before the arrival. When the output of the counter 211 is n−k−1, the error detector 23 determines that no channel error is present. On the contrary, if the output of the counter 211 is not n−k−1 or under other conditions, the error detector 23 determines that the channel error is present.

As apparent from the above description, according to the present invention, the decoding operation is performed once in detecting the frame/burst synchronization and the channel error using the COSET code which is obtained by inverting the first and last bits of the code word. Also, the bit inversion is not required in the synchronization syndrome calculating step. The bit inversion is merely required in recovering the message block.

Further, according to the present invention, only the last bit of the code word can be marked so that the bit slip detection range can be extended by one bit as compared with the conventional manner. Therefore, the bit inversion is not required even in recovering the message block. In result, the present invention has the effect of making the system construction more simple.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for detecting a frame/burst synchronization and a channel error using a cyclic code (n,k), comprising means for receiving a block of 2n−k bits, dividing the received block into a head block including first n−k bits of the received block, a middle block including the subsequent k bits of the received block and a tail block including last n−k bits of the received block, obtaining head and tail syndromes on the basis of the divided head, middle and tail blocks and discriminating the frame/burst synchronization and the presence of the channel error on the basis of the obtained head and tail syndromes.

2. A system for detecting a frame/burst synchronization and a channel error using a cyclic code (n,k), as set forth in claim 1, wherein said means includes:

a delay circuit for delaying the received block for a predetermined time period;

a decoder for performing a cyclic redundancy check decoding operation upon inputting the middle block of the received block, to calculate a syndrome of an n-bit block obtained by adding n−k "0" bits to the middle block;

a synchronization/error detection logic circuit for detecting a bit slip and the presence of the channel error on the basis of the syndrome calculated by said decoder and the head and tail blocks; and a message block output unit for outputting a message block of the received block in response to the bit slip detected by said synchronization/error detection logic circuit.

3. A system for detecting a frame/burst synchronization and a channel error using a cyclic code (n,k), as set forth in claim 2, wherein said synchronization/error detection logic circuit includes:

a head/tail syndrome calculator for obtaining the head and tail syndromes on the basis of the syndrome calculated by said decoder and the head and tail blocks;

a counter for counting successive "0" bits of the head and tail syndromes obtained by said head/tail syndrome calculator;

a slip register for storing synchronization information from said counter; and an error detector for determining the presence of the channel error in response to an output of said counter.

4. A system for detecting a frame/burst synchronization and a channel error using a cyclic code (n,k), as set forth in claim 3, wherein said head/tail syndrome calculator includes first and second shift registers for storing the tail and head blocks, respectively, said head/tail syndrome calculator exclusive-ORing the syndrome calculated by said decoder with outputs of said first and second shift registers, respectively, to obtain the tail and head syndromes, and storing the obtained tail and head syndromes into said first and second shift registers, respectively.

5. A system for detecting a frame/burst synchronization and a channel error using a cyclic code (n,k), as set forth in claim 4, wherein said counter is adapted to count the successive "0" bits beginning with a least significant bit of the head syndrome stored in said second shift register while bits of the head syndrome are shifted, to extract the synchronization information, and then to count the successive "0" bits beginning with a most significant bit of the tail syndrome stored in said first shift register while bits of the tail syndrome are shifted, to extract information regarding the presence of the channel error, or said counter is adapted to count the successive "0" bits of the tail syndrome stored in said first shift register to extract the synchronization information and then to count the successive "0" bits of the head syndrome stored in said second shift register to extract the information regarding the presence of the channel error.

* * * * *